United States Patent [19]

Rutherford, Jr.

[11] Patent Number: 4,740,972
[45] Date of Patent: Apr. 26, 1988

[54] VITAL PROCESSING SYSTEM ADAPTED FOR THE CONTINUOUS VERIFICATION OF VITAL OUTPUTS FROM A RAILWAY SIGNALING AND CONTROL SYSTEM

[75] Inventor: David B. Rutherford, Jr., Rochester, N.Y.

[73] Assignee: General Signal Corporation, Stamford, Conn.

[21] Appl. No.: 843,468

[22] Filed: Mar. 24, 1986

[51] Int. Cl.$^4$ ............................................. G06F 11/08
[52] U.S. Cl. ....................................... 371/53; 371/37; 371/70
[58] Field of Search ...................... 371/14, 15, 16, 25, 371/27, 37, 53, 67, 70; 246/3, 4, 5, 28 F; 340/507

[56] References Cited

U.S. PATENT DOCUMENTS

| | | | |
|---|---|---|---|
| 4,307,463 | 12/1981 | Sibley | 371/14 |
| 4,368,534 | 1/1983 | Sibley | 371/53 |
| 4,494,717 | 1/1985 | Corrie | 246/28 F |
| 4,563,762 | 1/1986 | Sibley | 371/25 X |
| 4,617,662 | 10/1986 | Auer | 371/25 |

OTHER PUBLICATIONS

D. B. Rutherford, Jr. "Fail-Safe Microprocessor Interlocking . . . ", IRSE, 9/1984.

Primary Examiner—Jerry Smith
Assistant Examiner—Robert W. Beausoliel
Attorney, Agent, or Firm—Ronald Reichman; Martin LuKacher

[57] ABSTRACT

Continuous verification of vital (fail-safe) outputs from an information processing system is obtained without the need for large computing capacity (overhead). Multibit test sequences are provided continuously during successive subparts of the processor system cycle to vital output interfaces which invert the bits of the signals or do not pass them depending upon the state of the output. A compiler including a random access memory (RAM) addressed by a read only memory (ROM) is configured to divide each sequence by direct and inverse polynomials on alternately occurring parts of the system cycle to provide compressed data. After each part of the system cycle, checkwords are constructed using the resultant compressed data corresponding to each output which must be proven to be in its 'off' state. These checkwords are used to verify the vital operation of the system and may be applied to a vital decoder which controls the application of operating power to the output interfaces to disconnect operating power therefrom and condition the outputs to the restrictive state upon detection of a failure which may occur at any time during the entire system cycle.

21 Claims, 6 Drawing Sheets

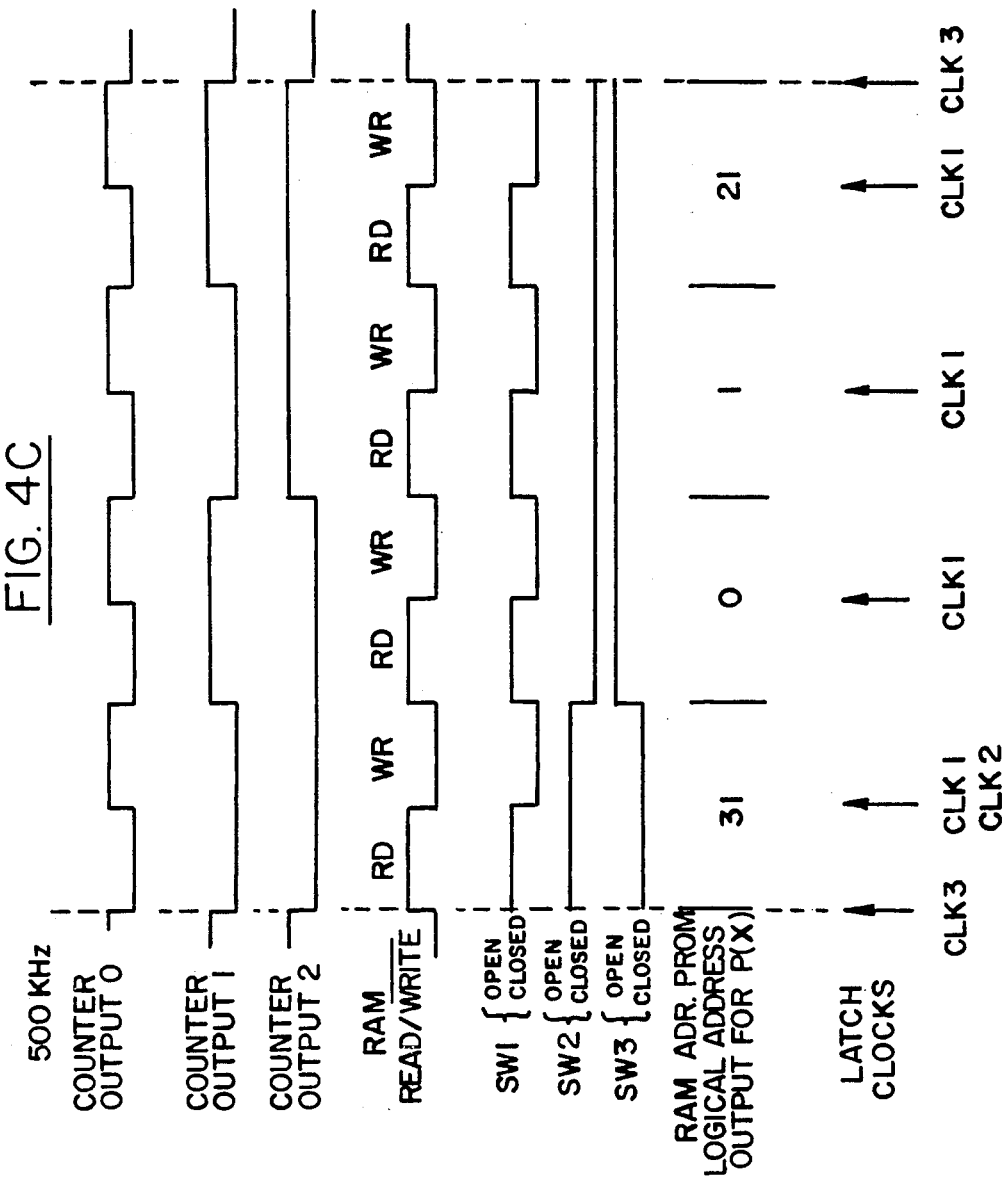

VITAL PROCESSING SYSTEM ADAPTED FOR THE CONTINUOUS VERIFICATION OF VITAL OUTPUTS FROM A RAILWAY SIGNALING AND CONTROL SYSTEM

DESCRIPTION

The present invention relates to information processing systems, and particularly to systems for verifying the vital (fail-safe) operation of information processing systems.

The invention is especially suitable for use in railway signaling and control systems which must be vital in their operation, i.e. restricted to the safe or "off" state of each output which controls a signal, switch machine or other signaling or control operation, unless the allowed or "on" condition thereof is enabled.

The invention is an improvement in vital systems using a computer or central processing unit which is non-vital in its operation, for example a microprocessor controlled interlocking control system for the complex of traffic control devices (switches and signals) of a junction or other complex of tracks which may contain several track sections, crossovers and sidings. Such a system is described in an article by David B. Rutherford, Jr., entitled "*Fail-Safe Microprocessor Interlocking—An Application of Numerically Integrated Safety Assurance Logic—,*" which is published in the Proceedings of the Institution of Railway Signal Engineers (IRSE) for Sept. 25-27, 1984. The system is described in greater detail in U.S. patent application Ser. No. 550,693 filed in the name of David B. Rutherford, Jr. on Nov. 10, 1983 and entitled "Vital Processor" and in U.S. patent application Ser. No. 550,430 filed in the name of James R. Hoelscher on Nov. 10, 1983 and entitled "Vital Interface System for Railway Signaling", now U.S. Pat. No. 4,611,291, issued Sept. 9, 1986. Both of these applications are assigned to the same assignee as the present application. The corresponding to the aforementioned U.S. application of David B. Rutherford, Jr. has been published in Great Britain as UK No. 2149540A on June 12, 1985.

It is the principal object of the present invention to provide improvements in vital information processing systems, and especially in the vital interlocking system discussed above wherein the vital characteristics of each output are checked continuously during the system cycle.

It is another object of the present invention to provide an improved vital information processing system wherein continuous verification of vital operating characteristics is provided without the need for a large computing capacity (computer overhead) or complex and expensive componentry.

In the interlocking system described in the above referenced patent applications, patent and article, verification of the vital output characteristics is obtained through the use of an absence of current detector (AOCD). The output state is reflected by the presence or absence of a current. This current is circulated through a winding of a saturable core. The core has in addition drive and sense windings through which test data are transmitted once during each system subcycle. A system cycle in the above-described interlocking system is one second. There are 20 subcycles of 50 milliseconds each. Test data are transmitted through the AOCD once each 50 milliseconds. Testing requires only a few hundred microseconds. Thus, testing goes on only about ½ percent of the time. While this sequence is satisfactory for most railway signaling operations considering the relatively slow speed of the trains, the relatively fast reaction time of the signaling devices make it desirable to provide for continuous verification.

Verification is accomplished by processing the test data which is transmitted through the AOCD. This is a 32-bit word and the conversion thereof into checkwords requires a considerable part of the microprocessor overhead. Accordingly, the provision for continuous verification exacerbates the problem of the capacity and overhead utilization of the microprocessor. The addition of another microprocessor would require additional vital processing and increase the expense and reduce the speed of verification of the vital processes, unless an expensive high-speed computer system were utilized. Since such systems are used in many remote locations it is both necessary and desirable to provide easily maintainable, low cost equipment.

The present invention provides methods and apparatus for continuous verification of the vital processes, and particularly the vital outputs from a vital processing system, without the need for complex computers or large computer overhead. It may be implemented utilizing readily available and low-cost memory devices, such as programmable read-only memories (PROMS) and random access memories (RAMS).

Briefly described, the system utilizes means for generating a plurality of sequences of bits repeatedly during each of the successive parts of the cycle of the vital information processing system. These sequences are transmitted through detecting means, such as the drive and sense windings of the AOCD, and provide output sequences corresponding to the input sequences and dependent upon the state of the outputs, e.g.; if the output is 'off', the sequence is passed in inverted form; if the output is 'on', the sequence is not passed. Means are provided for compiling each plurality of output sequences corresponding to each plurality of input sequences into a multibit resultant. This compiled resultant data is used in the vital processing system to verify the vital characteristics of the outputs. The compiling results in unique words, which not only detect a failure, but may be used for control purposes to verify continuity, as in lamp signaling systems and controllability as in relay-operated systems. The compiler utilizes a RAM wherein a number of bits from each sequence for each output may be stored. This RAM is addressed by a PROM which enables the bits of the output sequences to be "exclusively-or'ed" with the contents of different locations in the memory dictated by a polynomial divisor or divisors. A plurality of exclusive-or operations is carried on for each bit of each sequence. The locations in RAM are shifted for successive bits of the sequence. At the end of the passage of each sequence of bits through the detecting means into the RAM, there is stored in RAM a multibit number which corresponds to the sequence divided by the polynomial. This cycle may be repeated until all of the sequences which are generated continuously during each subcycle (the 50-millisecond subcycles mentioned above) are divided. The resultant compressed data word is unique for each output (if the output is in its 'off' state) and depends upon the absence of a failure mode and whether a continuity or controllability check is being carried out during the subpart of the system cycle. These resultant words are read into the vital processor central processing unit. In a presently preferred embodiment of the invention, voltage to the outputs is vitally dependent on the correctness of checkwords generated by combining the resultant compressed data words.

The foregoing and other objects, features and advantages of the invention as well as the presently preferred embodiment thereof and the best mode known for carrying out the invention will become more apparent from a reading of the following description in connection with the accompanying drawings in which.

Figure 5:
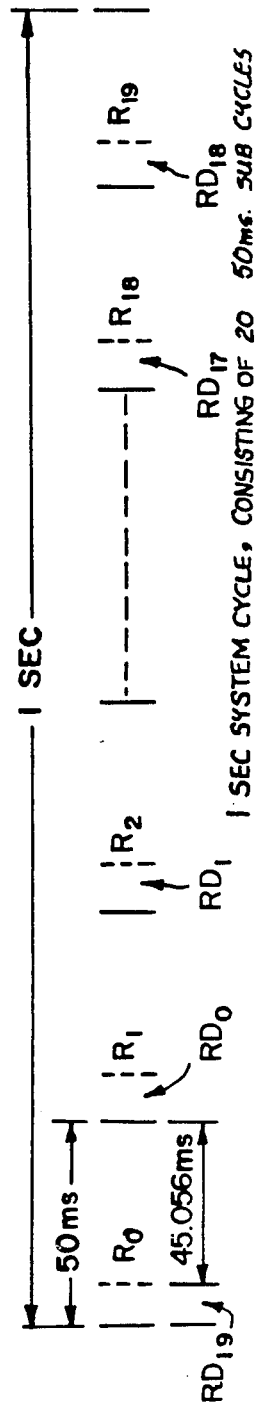
Figure 4A:
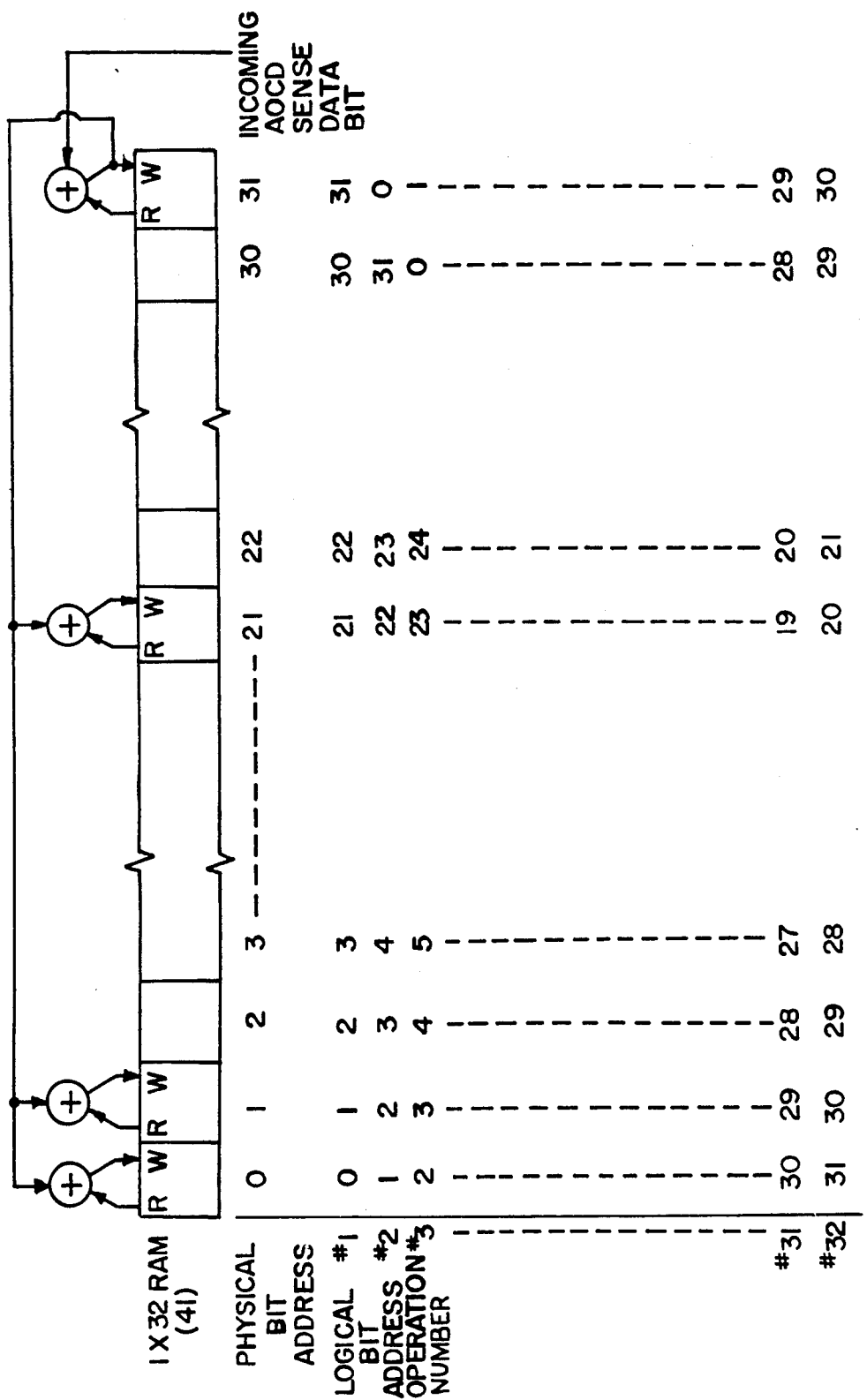

FIGS. 4A,B & C are diagrams illustrating the binomial division process, apparatus for the implementation thereof and the operation of such apparatus; and FIG. 5 is a timing diagram illustrating the system cycle.

Figure 1:
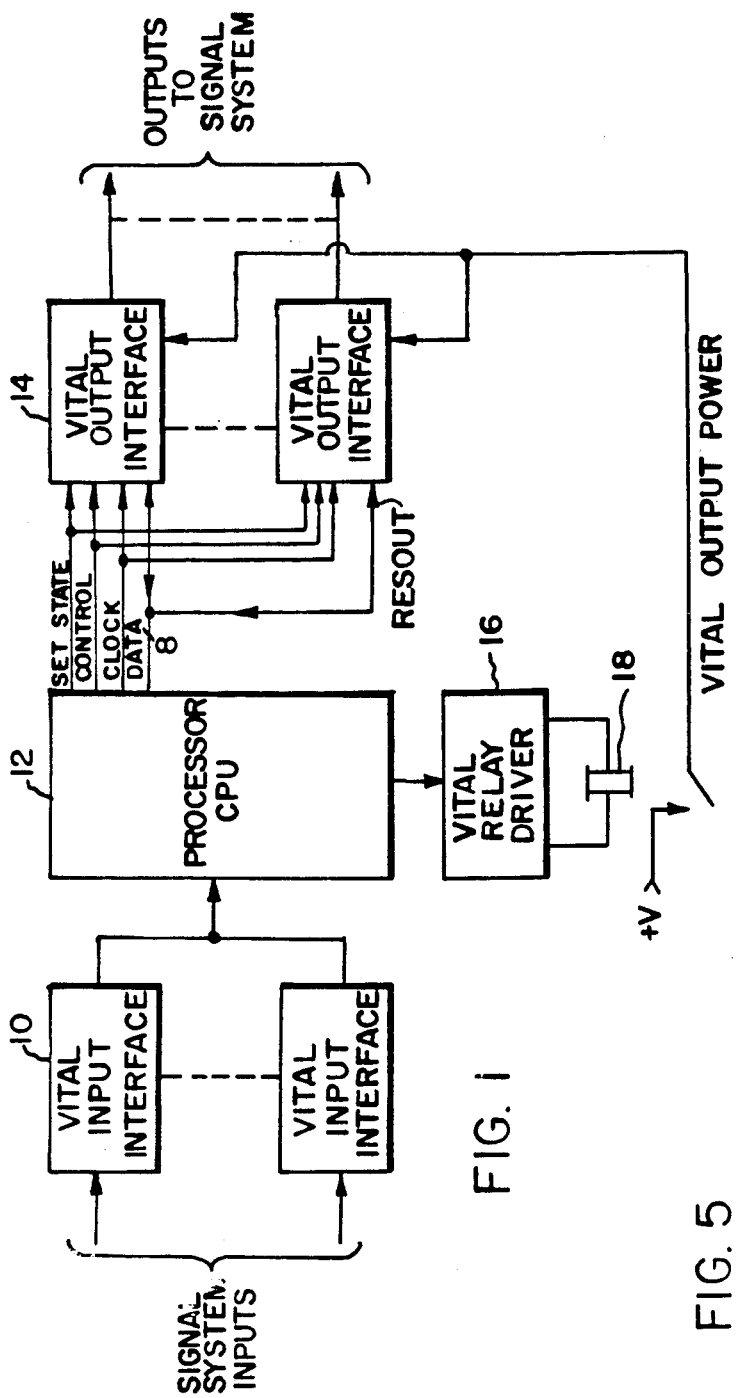
FIG. 1 is a block diagram illustrating, generally, a vital processing interlocking system in which the invention is used.

Referring more particularly to FIG. 1, there is shown a vital interlocking system generally similar to the system described in the above-referenced Hoelscher U.S. Pat. No. 4,611,291. The signal system inputs from the railway signaling devices are applied through vital input interfaces 10 which communicate with the vital processor, central processing unit (CPU 12). Based on the interlocking functions which are programmed into the vital processor CPU 12, the states of vital output interfaces 14 are set by set state lines. The vital characteristics of these output interfaces are checked by checkwords which are started, and checking operations which are timed, by clock and control signals from the vital processor CPU 12.

Each vital output interface may be on a separate board, containing for example eight output ports. There may be twenty or more output interface units or cards in a typical interlocking system thereby presenting a total of one hundred sixty outputs to the signal system. These outputs may be lamp drive outputs or single-or-double break relay equivalent outputs as discussed in the Hoelscher patent. Each of the vital output interfaces 14 provides outputs on the data lines of result words or bytes (RESOUT). These words are inputted to the vital processor CPU where they are combined with other data to form checkwords. Checkwords are formed from result data from each output port required to be in its 'off' state, or from CPU expression result data which, if 'true', allows the output port to be in its 'on' state. These checkwords are then presented to the vital decoder and relay driver 16. The generation of these checkwords is generally as described in the above identified Rutherford application. In the absence of a failure, the vital decoder and driver 16 is driven which picks up a vital relay 18 and enables power to be applied to the vital output interfaces 14. In the event of a failure, the vital decoder cannot provide vital power to the output interfaces and the vital outputs will go to their off or restrictive states. A failure can occur at any time during a system cycle.

A typical system cycle is shown in FIG. 5. The cycle is one second in duration and is made up of twenty subcycles of 50-millisecond duration each. These subcycles occur successively. In accordance with this invention, the result words are read out to the vital processor at the beginning of each subcycle, for the preceding subcycle. These result words are developed continuously during the preceding subcycle and reflect failures during any part thereof, except for a short deadband time between initialization and the generation of the test sequences. The checkwords are generated by the CPU and sent to the vital decoder 16 immediately after all result words from all system output interfaces are read.

The test sequences are comprised of unique signature sequences, 32 bits in length and repeated 176 times, for a total of 5,632 bits. One bit is presented every eight microseconds (a 125 KHz bit rate). The test cycle during each subcycle occupies 45.056 milliseconds or more than 90% of each subcycle. The remaining time is allotted to the reading of the result word or byte data and the initialization of the checkword generator; the RAM in the polynomial divider of the compiler 20 (FIG. 2).

Figure 2:
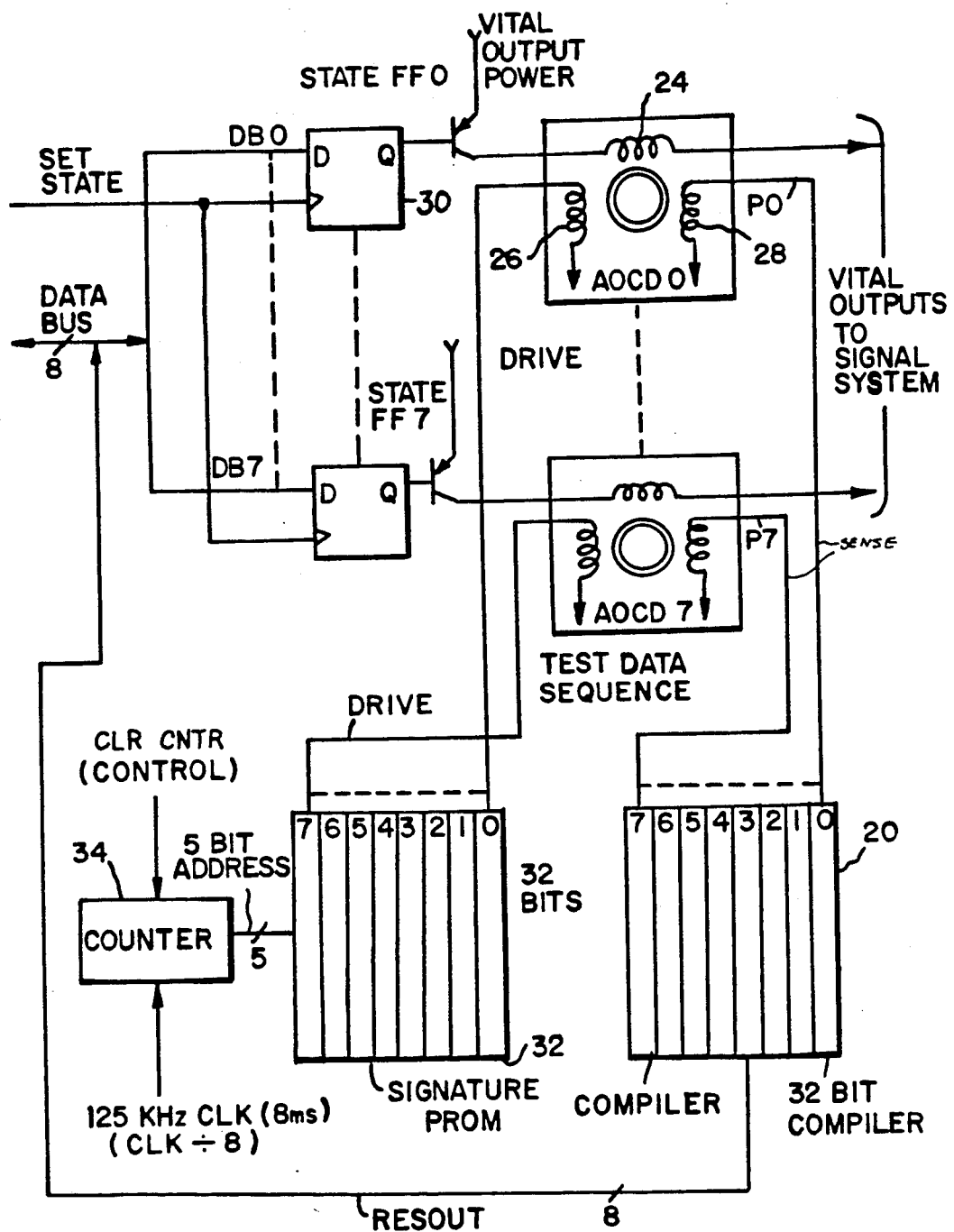
FIG. 2 is a more detailed block diagram of the vital output interface shown in FIG. 1.

Referring to FIG. 2, there is shown a portion of the output interface including the AOCD. The AOCD is shown schematically and reference may be had to the above-mentioned article and patent applications for further information with respect thereto. A separate AOCD is provided for each output port, and AOCD-0 through AOCD-7 are shown. Each AOCD has a saturable core 22 on which windings 24, 26 and 28 are located. The state of the output is determined by the current through the main winding 24. In the absence of current, the core is unsaturated and the input test data sequences which are applied to the winding 26 are coupled to the winding 28. When the core is unsaturated, there is an inversion in the transformer coupling, such that "1" bits appear as "0" bits. In the event that the output is on and current is present above some vitally determined threshold value (e.g., nominally 1 ma.), the core 22 is saturated so that the output winding produces an output train of bits all of the same value, for example corresponding to binary 1 bits.

The test sequence is generated with the aide of a PROM 32 which utilizes a column of 32 bits called the signature sequence for each output port. Each signature sequence stored in the PROM is unique for each output port, and each output port on each vital output interface 14 may have its own unique sequence.

The test sequence of 5632 bits presented to the 'drive' input of a specific AOCD is the same sequence during each of the twenty 50 ms. sub-cycles of the 1 sec. system cycle. The sequence received at the 'sense' output of the AOCD, which in turn is presented to the polynomial divider used as the data compiler 20, will vary, based on the state ('on' or 'off') of the output itself (i.e. whether the core of the AOCD is saturated or unsaturated).

In general, if the AOCD core is not saturated, the sequence received at the 'sense' winding of the AOCD is an inversion of the sequence presented to the 'drive' winding of the AOCD. If the core is saturated, the sequence received at the 'sense' winding is invariably all 1's (in the absence of failure).

There are four 'modes' of operation which may occur during a 50 ms. sub-cycle:

1. Mode 1 is that mode which is used to prove that the specific vital output port is in its 'off' (restrictive) state. In this mode, the output port is in its 'off' state during the entire 50 ms. sub-cycle. The test sequence consisting of 176 iterations of the unique 32-bit 'signature' sequence (5632 bits in all) is presented to the 'drive' winding of the AOCD. The inverted sequence is received at the 'sense' winding and delivered to one channel of the polynomial divider compiler.

Figure 3:
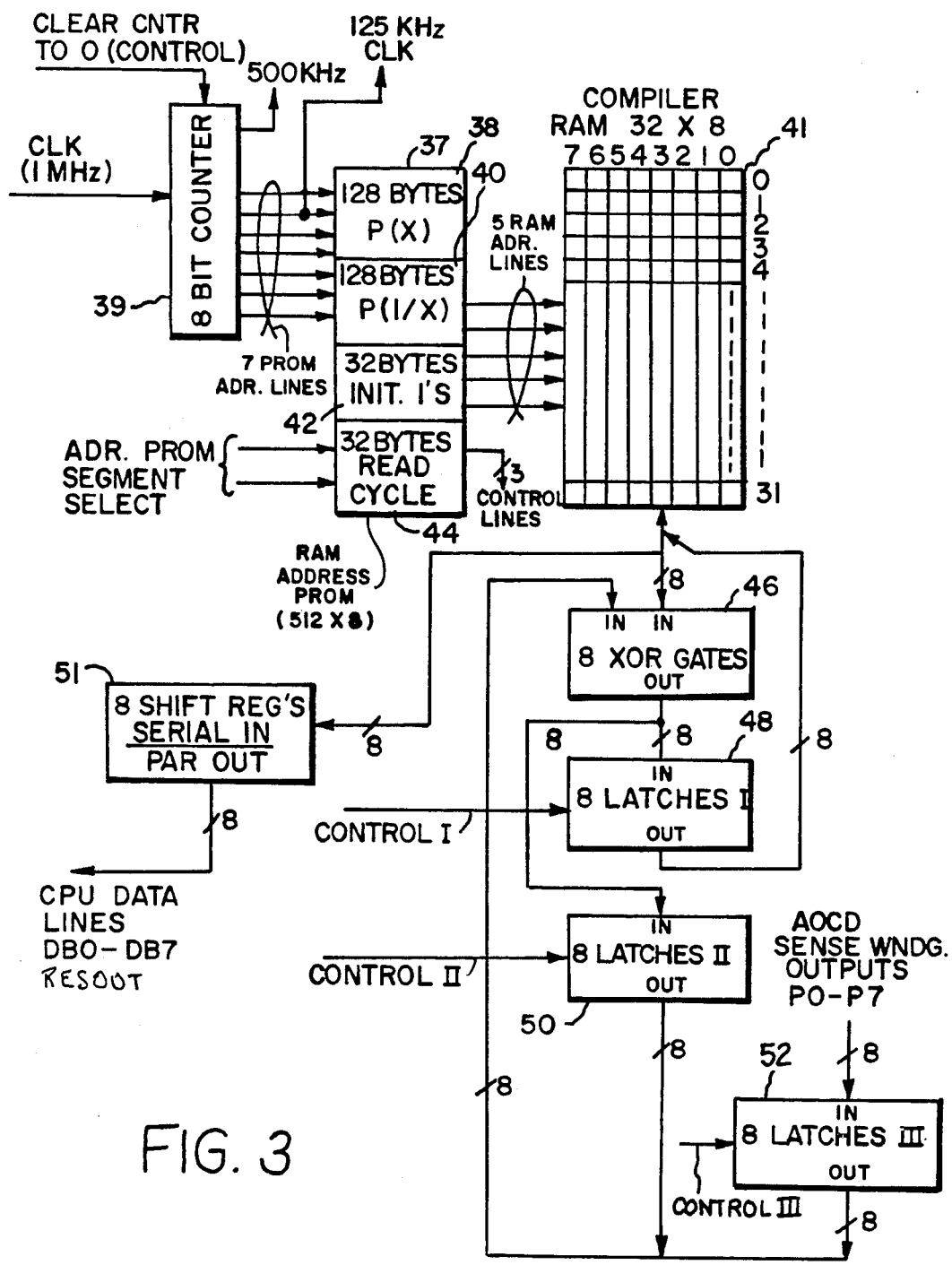
FIG. 3 is a more detailed block diagram illustrating the compiler of the vital output interface shown in FIG. 2.

The resultant data (32-bits) in the compiler resides in one of the eight 32-bit columns in the compiler RAM 41 (FIG.3). This 32-bit result data is unique to the specific port and also unique in the sense that it can only be produced if the AOCD is not saturated (i.e. the output port is 'off') for the entire time during which the 5632 bits are transferred through the AOCD.

Note that the 32-bit resultant data resident in the compiler RAM 41 is also dependent upon which polynomial divisor is used during the 50 ms. sub-cycle. Here the rule is that on 'even' sub-cycles, i.e. R0, R2, R4, . . ., R18, (See FIG. 5) the odd polynomial P(1/x) is used, so that when the resultant data is read on the subsequent sub-cycle (which will always be an 'odd' sub-cycle) it will represent 'odd' sub-cycle data to the CPU. Likewise, the 'even' polynomial (P(x)) is used on 'odd' sub-cycles R1, R3, R5, . . . , R19.

2. Mode 2 is essentially a default mode which occurs when a specific output port is in its 'on' state and the core of its AOCD is saturated. Although the same test sequence of 176 iterations of the 32-bit port-unique signature is presented to the 'drive' winding of the AOCD, the 'sense' winding output will be all 1's. Thus a bit stream of 5632 1's is delivered to the polynomial divider compiler 20. The 32-bit compiler resultant will be a specific non-unique value if the 'even' polynomial divisor is used, or another specific non-unique value if the 'odd' polynomial divisor is used. By 'non-unique', it is meant that regardless of the test sequence presented to the 'drive' winding of the AOCD, the 'sense' winding will always output a bit stream of all 1's, and thus the compiler resultant value will be the same for all test sequences, depending only on whether the 'even' or 'odd' polynomial divisor is used.

3. Mode 3 is a mode which normally occurs only during the R0 or R1 sub-cycles and is used to prove the continuity of the load connected to a particular output port. Specifically, this mode is used to prove the continuity of a lamp filament used as a load, however the continuity of any type of load can be proven as well.

In mode 3 the output port is nominally in its 'off' state. The port is then turned 'on' for a short period of time (approx. 256 us.) during which "one" iteration of the 32-bit signature sequence is presented to the 'drive' winding of the AOCD. This results in 32 1's being delivered to the compiler 20 by the 'sense' winding of the AOCD, since the AOCD core is now saturated. The output port is then changed to resume its 'off' state and the remaining 175 iterations of the 32-bit signature are presented to the 'drive' winding of the now unsaturated AOCD. The 'sense' winding now delivers the remaining 5600 bits of the 5632 bit test sequence to the compiler as inverted bits of the iterations of the signature sequence.

This results in another port-unique 32-bit resultant value in the compiler which proves the following:

a. The load is continuous since the compiler resultant value reflects the fact that the AOCD core was saturated (and thus current was flowing) during that portion of the sub-cycle the output port was turned 'on'.

b. The output port was nominally in its 'off' state, since the compiler resultant value reflects the fact that the AOCD core was unsaturated during exactly 175 of the 176 32-bit iterations of the signature 32-bit sequence.

c. The output port concerned is the specific output port meant to be referenced since no other port could return the same resultant data (i.e. the 32-bit signature sequence is port-unique not only for the ports on the particular output board but for the entire system).

4. Mode 4 is a mode which normally occurs during the R0 or R1 sub-cycles and is used to prove both the 'controllability' of a particular output port and the presence of current flowing through the load of that port. Controllability is proven by cycling the state of the port from its 'on' state to its 'off' state and then back to its 'on' state. If the load to the port is continuous, the presence of current flowing through the load is proven as well.

In mode 4 the output port is nominally in its 'on' state. The port is then turned 'off' for a short period of time (approx. 256 $\mu$s.) during which 1 iteration of the 32-bit signature sequence is presented to the 'drive' winding of the AOCD. This results in the 32 bits of the signature sequence of the port being delivered (inverted) to the compiler by the 'sense' winding of the AOCD. The output port is then changed to resume its 'on' state and the remaining 175 iterations of the 32-bit signature are presented to the 'drive' winding of the now saturated AOCD. The 'sense' winding now delivers the remaining 5600 bits of the 5632 bit test sequence to the compiler as all 1's.

This results in another port-unique 32-bit resultant value in the compiler which proves the following:

a. The load is continuous since the compiler resultant value reflects the fact that the AOCD core was saturated (and thus current was flowing) during that portion of the sub-cycle the output port was turned 'on'.

b. The output port, nominally in its 'on' state, is 'controllable', i.e. can be turned 'off', since the compiler resultant value reflects the fact that the AOCD core was unsaturated during exactly 1 of the 176 32-bit iterations of the signature 32-bit sequence.

c. The output port concerned is the specific output port meant to be referenced since no other port could return the same resultant data.

In the operation of the vital output interfaces, shown in FIG. 2, the states of each of the 8 output ports on an output interface are set by providing a '1' or '0' on the appropriate 8 data lines (DB0 thru DB7) and toggling the 'SET STATE' line. The 8 memory elements (D-flip flops, one for each output port) retain the state set. If the line DBn was '1', port 'n' is set to its 'on' state. Likewise if DBn was '0', port 'n' is set to its 'off' state.

To begin the transmission of the 5,632 bit test to each of the 8 AOCD's, a control line (CLR CNTR), clears the counter 34 used to address the signature PROM 32 to zero.

The 125 KHZ clock line is then turned on. Each positive transition of the clock increments the counter 34 which in turn increments the address of the signature PROM 32 which presents 1 bit of each port's 32-bit signature sequence to the 'drive' winding of the AOCD corresponding to that port. The 32-bit signature sequences are arranged 'vertically' in PROM.

Since the counter 34 is a 5-bit binary counter, after thirty-two positive transitions of the clock, the address sequence of the counter output repeats; thus providing continuous 32-bit iterations of the 8 32-bit signature sequences to the 'drive' winding of the respective AOCD's.

To provide continuous iterations of the signature sequence (i.e. 176 iterations totalling 5632 bits) without interruption, the clock (controlled by the CPU 12-FIG. 1) provides 5632 continous positive transitions at 8 $\mu$s.

intervals. This operation is used to accomplish modes 1 & 2.

To accomplish the operations required by modes 3 & 4, the clock is controlled by the CPU to provide thirty two positive transitions and is then halted so that the states of the output ports can be changed. The clock is then resumed and exactly 5600 additional positive transitions are provided.

It should be noted that the physical characteristics of the AOCD are such that each bit in the test sequence presented to the 'drive' winding should be present for at least 8 μs. for the data to pass through the AOCD to its 'sense' winding (when the core is unsaturated). Any significant reduction in this time will not result in accurate transmission of the test sequence through the AOCD. Thus a failure which would significantly increase the clock speed, thus providing a 'test' of the state of the output port for less than the nominal 45.056 ms. of each 50 ms. sub-cycle, would not allow for a correct resultant value in the polynomial divider compiler. If this were the case, the incorrect resultant values from the compiler would not allow the vital decoder to provide power to the output interfaces of the system and all outputs would revert to their 'off' or restrictive states.

As will be described in connection with FIG. 3, each compiler column is initialized to a known state (all 1's) at the beginning of each 50 ms. sub-cycle, prior to the start of transmission of the test sequence through each AOCD. The requirement is necessary for the compiler resultant values to compile to the correct port-unique results for modes 1, 3 and 4.

Referring to FIG. 3, the compiler 20 has as its principal component a RAM 41 having eight columns of 32 locations each. The 32 locations are for each of the bits of the compiler resultant sequences. The eight columns are for different ones of the output ports. The RAM is addressed by an address PROM 37 having 512, 8-bit words (a 4K PROM). This PROM 37 is addressed by 7-bits of an 8-bit counter 39 which receives the one MHZ clock and may also receive control preset lines from the vital processor CPU 12 (FIG. 1). The PROM 37 has four sections allocated to it. One of these sections 38 has 128, 8-bit words or bytes in order to address the RAM to compile the input sequences by dividing by a polynomial P(x). This polynomial is represented by the equation $$P(x) = 1 + x + x^2 + x^{22} + x^{32}. \quad (1)$$

The next section 40 of the 512 by 8-PROM has 128 bytes for addressing the RAM to compile by dividing the input sequences by a different polynomial which is the inverse of the above-given polynomial. This polynomial is represented by the following expression.

$$P(1/x) = 1 + x^{10} + x^{30} + x^{31} + x^{32} \quad (2)$$

The PROM has two other sections 42 and 44. These are used to initialize the RAM to all ones in each of its locations and to execute a read cycle of each of the 8 32-bit result words which are stored at the end of the compilation operation.

Polynomial division is carried out through the use of eight exclusive-or gates 46 and first and second sets of eight latches 48 and 50. The bits of each 32-bit sequence are stored in eight additional latches 52 which receive the output bits PO-0 through PO-7 from the B, AOCD sense windings.

The compiler divides each of the 8 5632-bit sequences received from the outputs of the 8 AOCD 'sense' windings by one of the two polynomials, P(x) or P(1/x), continuously. However, since the polynomials are of degree 32 (hence the compiler resultant values are 32 bits in length), the operation of the polynomial divider will be explained for the first 32-bits of the 5632 bit sequence and the remaining 175 groups of 32 bits are a repetition of the same operation.

The 8-bit counter 39 receives a control signal from the CPU 12 (FIG. 1) which clears the counter to zero. It also receives a 1 MHZ clock signal from the CPU which synchronizes the entire compiler operation. It receives exactly 5632 cycles of the 1 MHZ clock during the 50 ms sub-cycle.

The least significant output bit of the 8-bit counter is a 500 KHZ clock signal used elsewhere. The 3rd output of the counter is the 125 KHZ clock signal shown in FIG. 2. The 7 most significant outputs of the counter are used to address one of the two 128-byte sections 38 or 40 of the 512×8 PROM, sequentially. Also the 5 most significant bits of the counter are used as the 5 address lines to the 32×8 signature PROM shown in FIG. 2 as being derived from counter 34.

At the beginning of a 32-bit sub-sequence of the 5632-bit sequence, the 8-bit latch III 52 is controlled to hold the 1st bit of the 32-bit sub-sequence output from the 'sense' windings of each of the 8 AOCD's.

The compiler RAM 41 has been previously initialized to all 1's. The action of the polynomial divider (explained in detail below with reference to FIG. 4), exclusive-or's together the contents of latch III with the current contents of one of the 32, 8-bit bytes in the compiler RAM 41 and stores this intermediate result in latch I 48 and in latch II 50. The contents of latch I are then written back into the compiler RAM at the same location. Then the contents of 3 other 8-bit bytes of the compiler RAM (the address of these bytes determined ultimately by the polynomial being used, i.e. P(x) or P(1/x)) are consecutively exclusive-or'ed with the intermediate result stored in latch II 50, the result of which is temporarily stored in latch I, and then written back into the compiler RAM at the same address.

After these 4 operations are completed, latch III is again controlled to hold the next bit in the 32-bit subsequence.

This sequence of 4 exclusive-or operations is then repeated for each bit of the 8 simultaneous 32-bit sub-sequences using different RAM address for each set of 4 operations.

After the 1st 32-bit sub-sequence, the identical set of operations for the subsequent 175, 32-bit sequences is performed. Note, however, that the data accumulating in each of the 8, 32-bit columns in compiler ram are continuously changing throughout the 176 32-bit sequences such that if the 5632 bit sequences were ever not exactly 5632 bits in length (even if stopped on a 32-bit sub-sequence boundary or extended beyond the 5632 bit sequence length) the ultimate 32-bit resultant values would not be the correct resultant values.

Figure 4B:
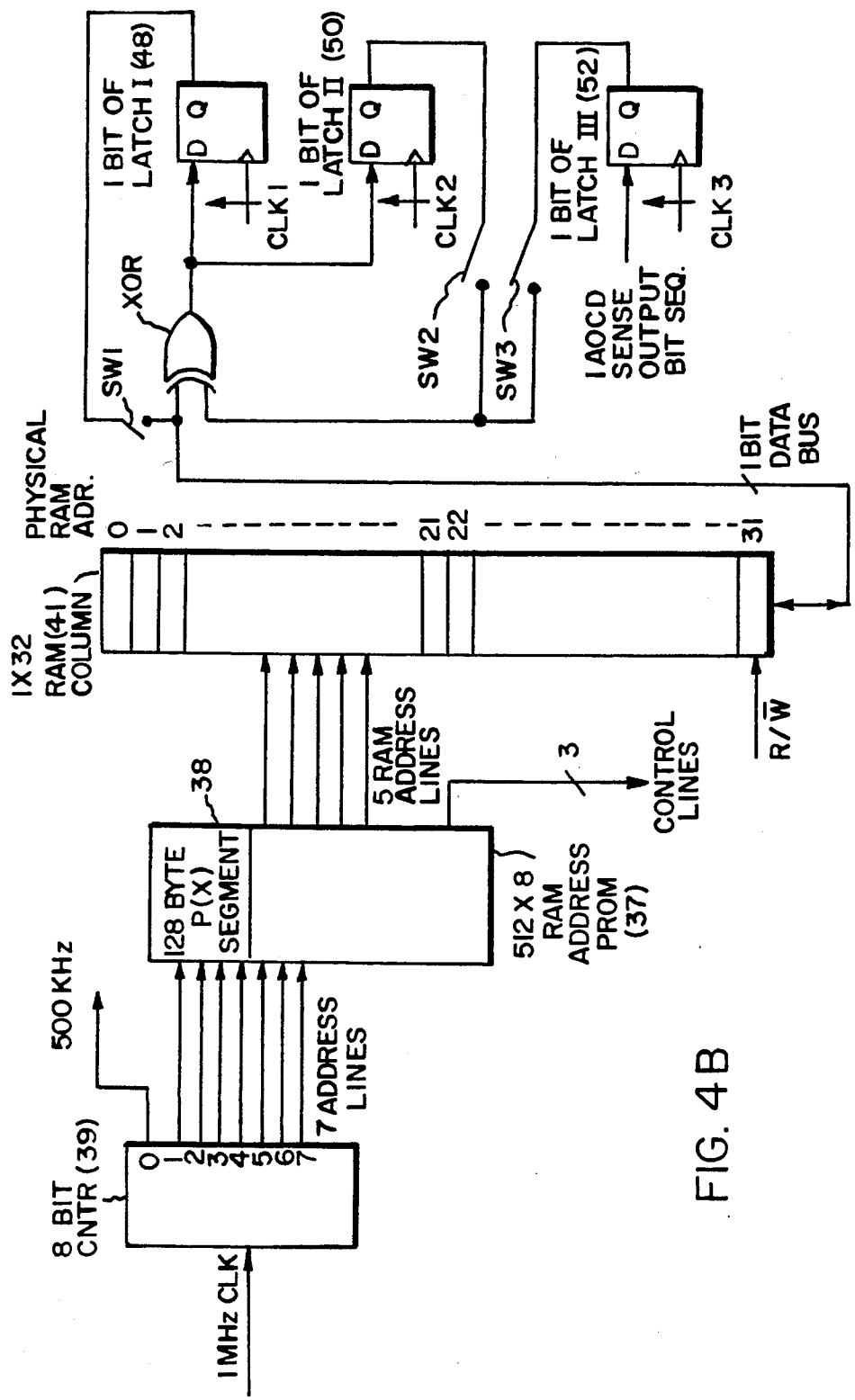

The details of the operation of polynomial division will become more apparent from FIGS. 4A, 4B and 4C.

FIG. 4A shows the division of a bit stream (one of the 8 bit sequences received from the 'sense' winding of an AOCD). The division of one 32-bit sub-sequence will be described, using polynomial P(x) which is set forth in equation (1). In FIG. 4A the division is shown implemented in one, 32-bit column of the compiler RAM 41.

First consider that the 32 RAM bits have been initialized to all 1's and make the distinction between 'physical' and 'logical' addresses. The following exclusive-OR (XOR) operations described below are made on the same 4 'logical' addresses of the RAM 41 bits, but these logical addresses will assume different physical addresses after each set of four XOR operations. Initially, the logical and physical addresses of the 32 RAM bits in each column of the compiler RAM 41 are identical.

To begin the polynomial division operation, the first bit in the data stream (which is latched in latch III) (FIG. 3) is XOR'ed with the contents of RAM logical address 31 (at the right in FIG. 4A) and then written back into RAM address 31. The result of this XOR is then stored for further use in one of the bits of the 8-bit latch II (FIG. 3). This stored intermediate result is then XOR'ed with the contents of RAM logical address 0 and the result is written back into RAM address 0. The same intermediate result is then XOR'ed with the contents of RAM logical address 1 and written address 1, and likewise the intermediate result is XOR'ed with the contents of RAM logical address 21 and written back into the RAM at address 21. The next operation is to effectively change the logical addresses of the 32 bits in the RAM with respect to the RAM physical addresses by rotating the logical address one bit to the right. Thus the RAM bit at physical address 0 becomes logical address 1, physical address 1 becomes logical address 2, etc., and finally physical address 31 becomes logical address 0.

The 2nd bit in the 32-bit subsequence from the output of the 'sense' winding of the AOCD is then latched into latch III, and the same XOR operations are performed on the same set of 'logical' addresses, which now reside at different physical addresses. The process continues for the remaining bits of the 32-bit subsequence. After the XOR operations on the 32nd bit of the subsequence, the 'logical' and 'physical' addresses of the RAM again coincide.

FIGS. 4B and 4C show in more detail the operations of latches I, II and III and the exclusive-or (XOR) gates, again, as in FIG. 4A, for one column of the compiler RAM. One stage of each is shown. Switches 1, 2 and 3 represent schematically the operations of enabling and disabling (tri-stating) the outputs of the 3 latches into one input of the exclusive-or gate and onto the bi-directional data bus of the RAM 41 column. Again only one exclusive-or gate of the set of eight gates is shown and the RAM data bus is shown as only 1 bit wide for clarity (the 1-bit RAM bi-directional data bus accesses one column of compiler RAM 41).

One bit of AOCD sense winding output data is presented to the "D" input of latch III and is toggled into the latch via the rising edge of clk3. The counter 39 is initialized to zero. The counter 39 increments 8 counts for each AOCD output bit in the sequence. Every two counts an XOR operation is performed. The least significant bit of the counter output is 500 KHZ clk signal, while the seven most significant counter outputs are used to sequentially addresss the RAM address PROM. The sequence of operations is as follows:

a. At the beginning of the following set of operations, clk3 latches the output AOCD bit into latch III. The counter output addresses the first byte in the RAM Address PROM 37, which in turn addresses logical bit 31 (at this point also physical bit 31) in the RAM. SW3 is closed, SW1 and 2 are open. The read input to the RAM is active, and the contents of logical RAM address 31 appears on the 1-bit data bus and thus one input of the XOR gate. The bit latched in latch III appears at the other input of the XOR gate. The XOR output appears at the 'D' input of latch I.

b. Clk 1 and clk 2 appear coincident with the next positive edge of the 500 KHZ clk to latch the XOR gate result into latch I and latch II.

c. The 1-bit RAM bus direction is changed to the RAM write mode and with SW1 now closed, the XOR result stored in latch I is written back into the RAM at logical address 31.

d. The counter 39 output now increases to address the second byte in the RAM Address PROM which in turn addresses logical bit 0 of the RAM 41 column. The RAM bus is changed to the 'RAM read' direction and the contents of logical address 0 is presented to one input of the XOR gate with SW1 open. SW2 is then closed and SW3 is opened for the remainder of the cycle for this bit of the sequence. SW2 presents the previously latched intermediate value of latch II to the other input of the XOR gate, and clk1 latches this XOR result into latch I.

e. The 1-bit RAM bus direction is changed to the RAM write mode and with SW1 now closed, the XOR result stored in latch I is written back into the RAM at logical address 0.

f. The counter 39 output now increases to address the third byte in the RAM Address PROM 37, which in turn addresses logical bit 1 of the RAM 41 column. The RAM bus is changed to the 'RAM read' direction and the contents of logical address 1 is presented to one input of the XOR gate with SW1 open.

SW2 presents the previously latched intermediate value of latch II to the other input of the XOR gate, and clk1 latches this XOR result into latch I.

g. The 1-bit RAM bus direction is changed to the RAM write mode and with SW1 now closed, the XOR result stored in latch I is written back into the RAM at logical address 1.

h. The counter 39 output now increases to address the fourth byte in the RAM Address PROM 37, which in turn addresses logical bit 21 of the RAM column. The RAM bus is changed to the 'RAM read' direction and the contents of logical address 21 is presented to one input of the XOR gate with SW1 open.

SW2 presents the previously latched intermediate value of latch II to the other input of the XOR gate, and clk1 latches this XOR result into latch I.

i. The 1-bit RAM bus direction is changed to the RAM write mode and with SW1 now closed, the XOR result stored in latch I is written back into the RAM at logical address 21.

j. The counter 39 is incremented again and now addresses the fifth byte of the RAM Address PROM. Steps "a" thru "i" are repeated 31 times, the only difference being that the physical RAM addresses corresponding to the logical addresses indicated above shift each time the above steps are repeated. After the entire process has been completed for 32 bits of the 5632-bit sequence, the counter is again at zero and the process repeats 175 times.

The references to the logical addresses in the above description are for polynomial P(x) used as the divisor. When polynomial P(1/x) (Equation 2) is used, the logical RAM addresses are changed from the sequence of 31-0-1-21 to 31-9-29-30 respectively.

Immediately after readout, the initialization section of the PROM 37 is selected and "ones" are written into each location of the RAM 41. On alternate subcycles the inverse polynomial is used as the divisor. Then the second section 40 is selected and the 128 bytes therein are read out 176 times. It will be apparent that the RAM is used to provide the same function as a shift register polynomial divider, but without the need for 32-bit shift registers or equivalent programming of a CPU.

When the result values are presented to the vital processor CPU they are used to form checkwords for those outputs which are not specifically allowed to be in their 'on' states as a result of Boolean expressions evaluated to their required 'true' results. The verification and evaluation operations are described in detail in the above-referenced patent applications.

From the foregoing description it will be apparent that there has been provided improved vital information processing systems which are adapted for use in railway signaling and control applications. Variations and modifications in the herein-described systems as well as other applications therefor, will undoubtedly suggest themselves to those skilled in the art. Accordingly, the foregoing description should be taken as illustrative and not in a limiting sense.

I claim:

1. The method of testing a signaling channel of a system having an operating cycle which comprises the steps of generating a plurality of successive words during substantially all of each of a plurality of successive subcycles of said cycle to produce pluralities of words in each of said subcycles, inputting said pluralities of words into and outputting said pluralities of words from said channel throughout said operating cycle to produce pluralities of outputted words continuously throughout said cycle, each plurality of said pluralities of said outputted words being produced during a different one of said subcycles, compiling the pluralities of outputted words into output words which reflect the format of each said plurality of outputted words and the effect thereon of said channel, and verifying the operation of said channel from said output words.

2. The method according to claim 1 wherein said compiling step is carried out by dividing each word of said plurality of outputted words by a polynomial to provide each of said output words.

3. The method according to claim 2 wherein said dividing step is carried out with a different polynomial during different ones of said successive subcycles.

4. The method according to claim 3 wherein said different polynomials are two polynomials, one being the inverse of the other.

5. The method according to claim 4 wherein said dividing step is carried out with said one and said other polynomials during alternate ones of said successive subcycles.

6. The method according to claim 1 wherein said channel has a circuit which reflects the output state thereof, said inputting and outputting steps being carried out by applying said pluralites of successive words to said circuit and detecting outputted words said therefrom.

7. The method according to claim 6 wherein said circuit is an absence of current detector (AOCD) wherein the presence and absence of current represents the state of said output, said circuit having a saturable magnet core and a control winding through which the state representing current passes and input and output windings, said inputting step is carried out by presenting multibit digital signals representing each plurality of said pluralities of successive words to said input windings and said outputting step is carried out by detecting said digital signals at said output winding.

8. The method according to claim 1 wherein said successive word generating step is carried out with the aid of memory means having storage for multibit words, said inputting step is carried out by applying repetitively, sequences of said successive bits from said memory means to said channel.

9. The method as set forth in claim 8 wherein said system comprises a plurality of said channels and said memory means has storage for a plurality of unique multibit words for each of said channels, and said inputting step for each channel is carried out with a different one of said unique multibit words from said memory means, and said compiling and verifying steps are carried out separately for each said channel.

10. The method of testing a signalling channel of a system having an operating cycle which comprises the steps of generating a plurality of successive words during each of a plurality of successive parts of said cycle to produce pluralities of words, inputting said pluralities of words into and outputting said pluralities of words from said channel throughout the operating cycle to produce pluralities of outputted words continuously throughout said cycle, compiling the pluralities of outputted words into output words which reflect the format of said plurality of words and the effect thereon the said channel, said compiling step including the step of dividing each word of said plurality of outputted words by a polynomial to provide each of said output words, said dividing step being carried out with the aid of a RAM having storage for the bits of each of said words in different locations thereof by presenting each bit of each of said outputted words and conducting a plurality of exclusive or logical operations in sequence utilizing each bit of said outputted words and the bits stored in the locations of said RAM selected in accordance with said polynomial and shifting the locations upon presentation of a successive bit of said outputted word, and verifying the operation of said channel from said output words.

11. The method according to claim 10 wherein said locations are obtained by addressing said RAM for readout and write-in of bits at said selected locations during each of said exclusive or operations for each of the bits of said output words.

12. The method according to claim 11 further comprising the step of reading out each of said locations of said RAM during each of said parts of said cycle to provide said output words.

13. The method according to claim 12 further comprising the step of initializing said RAM by writing like bits in all locations thereof prior to said dividing operation during each of said parts of said cycle.

14. The method according to claim 11 wherein said addressing step is carried out with the aid of a read-only memory (ROM) and controlling the addressing of said RAM and the timing of said exclusive or operations with said ROM, reading out selected locations of said ROM during each of said parts of said cycle.

15. In a vital information processing system adapted for railway signaling and control operations and having means for detecting the state of the outputs therefrom, a system for vital verification of the state of the outputs from the processing system continuously during each processing system cycle, said verification system comprising means for generating a plurality of input word sequences, each of said input said sequences containing a plurality of unique multibit input words, repeatedly during substantially all of each of a plurality of successive subcycles of the system cycle; means for transmitting said input word sequences through said detecting means for providing during each of said subcycles a plurality of sequences of outputted words corresponding to said input word sequences and dependent upon the state of the outputs; means for compiling each of said sequences of outputted words into a multibit output word for each of said sequence of outputted words, the value of which depends upon the absence or presence of a failure mode in the system, for use in said processing system to verify that the state of said outputs is vital.

16. In a vital information processing system adapted for railway signaling and control operations and having means for detecting the state of the outputs therefrom, a system for vital verification of the state of the outputs from the processing system continuously during each processing system cycle, said verification system comprising means for generating a plurality of input word sequences, each of said input word sequences containing a plurality of unique multibit words, repeatedly during each of a plurality of successive parts of the system cycle; means for transmitting said input word sequences through said detecting means for providing a plurality of sequences of outputted words corresponding to said input word sequences and dependent upon the state of the outputs; means for compiling each of said sequences of outputted words into a multibit output word for each of said sequences of output words, the value of which depends upon the abscence or presence of a failure mode in the system, for use in said processing system to verify that the state of the outputs is vital, and said compiling means comprising means for dividing each sequence of outputted words in each plurality of sequences by at least one polynomial.

17. The system according to claim 16 wherein said dividing means includes means for dividing alternate pluralities of sequences of outputted words by different polynomials.

18. The system according to claim 17 wherein said means for dividing is operative to divide said alternate pluralities of an outputted word sequences by polynomials which are the inverse of each other.

19. The system according to claim 16 wherein the said sequences each have a given number of bits, said dividing means comprises RAM means having location for storage of the remainder of the division of each sequence of outputted words by the polynomial, ROM means for addressing said RAM means to enable read-in and write-out from different locations of said RAM means a plurality of times for each bit of each of said sequences, said dividing means also including logic means including means for providing exclusive or operations, and means controllable by said processing system for reading out said RAM means and presenting each bit of each said sequence and each of said sequences a plurality of times to said logic means together with the contents of different locations of said RAM means selected in accordance with said polynomial to provide said output word in said locations in said RAM means for each plurality of said outputted word sequences.

20. The system according to claim 19 wherein said ROM means has locations for addressing said RAM and to effect division by different polynomials during the presentation of the plurality of sequences of bits which occur during different ones of said successive parts of said system cycle.

21. The system according to claim 19 herein said generating means comprises memory means including ROM means having storage for said unique input words, for each of said outputs of said processing system.

* * * * *